United States Patent [19]
Beehler

[11] 3,708,999
[45] Jan. 9, 1973

[54] VIBRATION DAMPING HUB PROPELLER TYPE FANS

[75] Inventor: Richard F. Beehler, Beach Grove, Ind.

[73] Assignee: Lau Incorporated, Dayton, Ohio

[22] Filed: Dec. 14, 1970

[21] Appl. No.: 97,711

[52] U.S. Cl. ................................................64/11 R
[51] Int. Cl. .............................F16d 3/28, F16d 3/52
[58] Field of Search....64/11 R, 13, 27 NM; 416/500, 416/134

[56] References Cited

UNITED STATES PATENTS

| | | | |
|---|---|---|---|
| 3,005,497 | 10/1961 | Klonoski et al. | 416/134 |
| 2,716,334 | 8/1955 | Scott et al. | 64/27 NM X |
| 2,773,365 | 12/1956 | Delf et al. | 416/134 X |
| 3,084,963 | 4/1963 | Beehler | 64/11 R X |

Primary Examiner—William F. O'Dea
Assistant Examiner—W. C. Anderson
Attorney—Marechal, Biebel, French & Bugg

[57] ABSTRACT

A vibration damping hub is designed especially for use with relatively large diameter propeller-type fans to reduce the transmission of noise from the fan blades, particularly where an electric drive motor is speed regulated through semi-conductor devices which impart impulses to the motor and cause undesired noise-producing harmonics. A pair of annular elastomeric blocks are formed with arcuate cut-outs which receive corresponding drive lugs formed on a radial extension of a drive hub. The blade spider is similarly formed with inwardly extending lugs, as is a cap member, which respectively encircle and engage the pair of elastomeric blocks. The arrangement is one in which the drive is accomplished through rotational compression of the blocks without the necessity of axially compressing the blocks.

5 Claims, 7 Drawing Figures

PATENTED JAN 9 1973 3,708,999
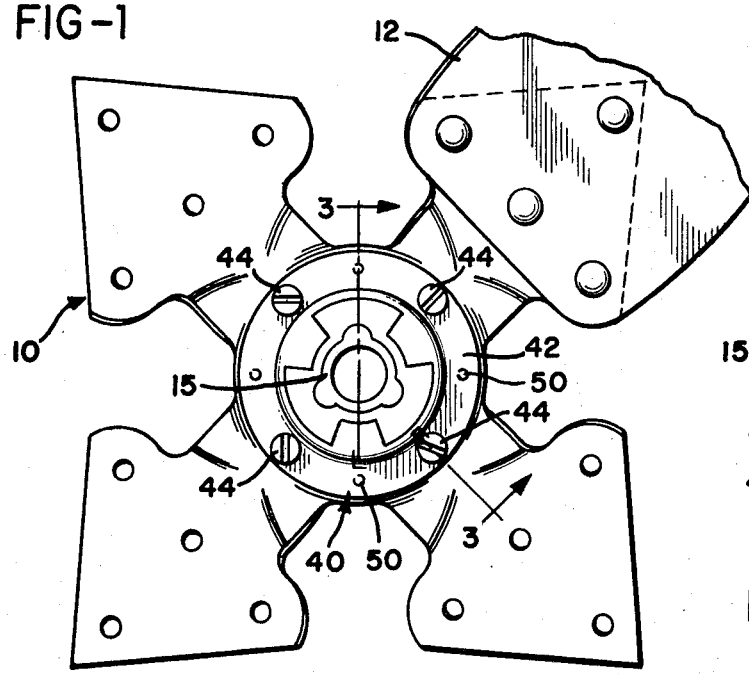
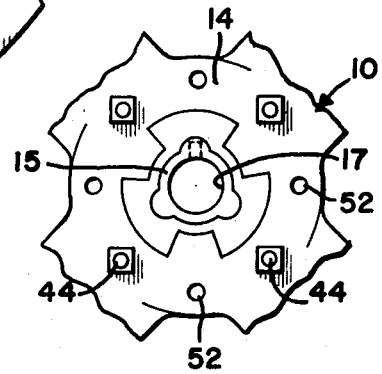
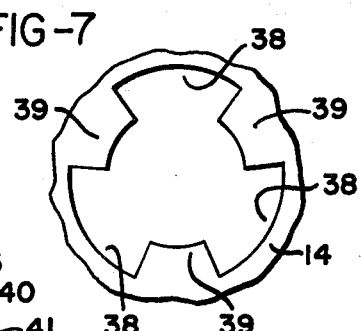
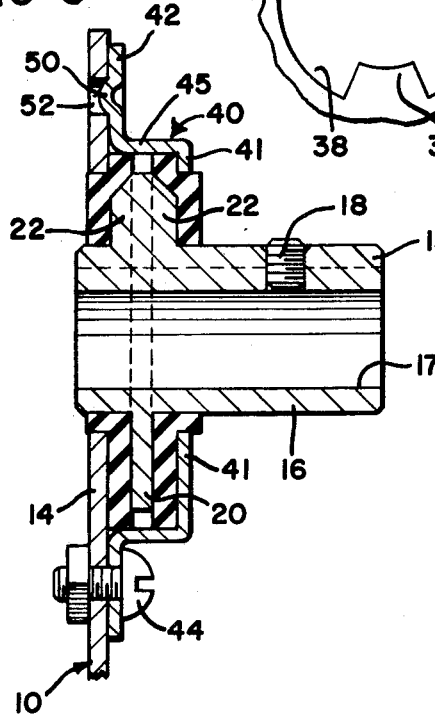
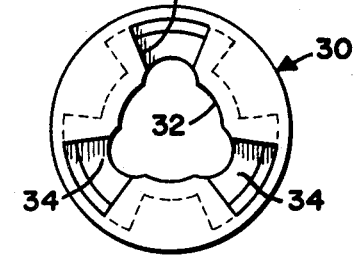
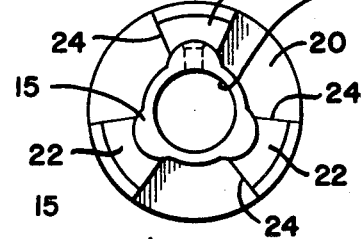
INVENTOR
RICHARD F. BEEHLER
BY
Marechal, Biebel, French & Bugg
ATTORNEYS

VIBRATION DAMPING HUB PROPELLER TYPE FANS

BACKGROUND OF THE INVENTION

Propeller-type fans for air moving applications are indentical and commonly formed with curved sheet metal blades. Where such fans are adapted to be operated at only preselected or given speeds, the effect of harmonic vibrations can be controlled by known means. However, where such fans are driven through a variable speed drive control, and particularly where such control employs solid state switching devices such as silicon controlled rectifiers, harmonics are introduced into the fan. Such harmonics tend to set up vibrations in which the fan blades themselves act as sound transducers. These cannot be effectively eliminated by convention damping means.

The problem of sound transmission by propeller-type sheet metal fan blades has been recognized, and resilient damping drive hubs have been employed for the purpose of reducing the transmission of angular velocity accelerations to the blades themselves. One such hub which has been successfully employed with medium to small diameter propeller fans is shown in my U.S. Pat. No. 3,084,963 of 1963. Still another arrangement is shown in the patent of Delf et al. No. 2,773,365 of 1956.

In my 1963 patent, identified above, there is shown an arrangement of elastomeric bushings and a drive hub. When driving with relatively low torque values, sufficient driving torque could be obtained without substantial compression on the bushings. However, as driving torque requirements increased it was found that greater axial compression was required in order to augment the gripping force between the resilient members and the spider. Also, in my prior patent, one of the resilient members was formed in interfitting relation to the other, and this means of transmitting torque from one side of the spider to the other works best at relatively low torque values.

SUMMARY OF THE INVENTION

The present invention is directed particularly to a resilient drive hub for a propeller fan in which a pair of opposed resilient annular blocks are driven only in rotational compression, and accordingly substantially all of the drive torque is transmitted through shear in the blocks. The arrangement is one in which the resilient members maintain their maximum damping effectiveness by reason of the lack of axial deformation or compression.

Preferably, the drive hub is formed with a radial annular extension on which are formed drive lugs. Preferably, the drive lugs are arranged in an arcuate annular pattern. The annular elastomeric blocks are suitably formed, such as by molding, with corresponding recesses adapted to receive the lugs. In this manner, the blocks are caused to rotate with the hub by reason of the interfitting relation of the drive lugs and the recesses.

The axially opposite sides of the elastomeric blocks are formed with some suitable arrangement of annular driving portions which, by design, may be formed axially opposite the recesses. A spider is formed with a series of corresponding arcuately spaced recesses to receive the driving portions of one of the blocks. An enclosing cap is formed with an identical series of recesses similarly to receive the driving portions of the opposite block. The cap is formed with a radial annular lip which is secured to the spider, and the axial depth of the cap is sufficient to accomodate the assembled drive blocks and the driving portion of the hub without significantly compressing the blocks in the axial direction.

It is accordingly an important object of the invention to provide a resilient drive hub for propeller type fans, particularly useful for mounting such fans on the drive shaft of variable speed motors.

Another important object of the invention is the provision of a vibration damping hub for a propeller type fan in which the driving connection between the hub and the fan spider is exclusively transmitted through interfitting driving lugs and recesses corporating with a pair of resilient members in such a manner that no axial compression of the resilient members is required.

Still a further object of the invention is to provide a vibration damping hub using a pair of resilient drive washers in which the washers are formed symmetrically so that the blade spider can be mounted either on the inboard or the outboard side of the hub, as desired.

These and other objects and advantages of the invention will be apparent from the following description, the accompanying drawings and the appended claims.

BRIEF DESCRIPTION OF THE DRAWINGS

FIG. 1 is an end view of a hub and spider assembly according to this invention;

FIG. 2 is a fragmentary end view of the assembly looking from the opposite end;

FIG. 3 is a vertical section taken generally along the line 3—3 of FIG. 1;

FIG. 4 is an elevation looking at the inside surface of one of the elastomeric blocks;

FIG. 5 is an end view of the hub alone;

FIG. 6 is an elevational view looking at the outside surface of one of the blocks; and FIG. 7 is a fragmentary elevation showing the cut-out arrangement as formed in the spider and the cap.

DESCRIPTION OF PREFERRED EMBODIMENT

Referring to FIG. 1, a four-armed spider is illustrated generally at 10 by means of which sheet metal propeller fan blades 12 may be mounted for rotation. Obviously, the spider may have greater or fewer number of arms, depending upon the design of the fan. The spider 10 is formed of a sheet metal stamping and has an inner annular, radially flat drive portion 14.

A drive hub adapted to be mounted to the shaft of the drive motor is illustrated generally at 15 in FIGS. 1 and 3. The hub 15 has an axial central portion 16 with a shaft opening 17 therein. One or more conventional set screws 18 are provided for mounting the hub onto the motor shaft.

The hub itself is formed with an annular radially extending driving portion 20 which is illustrated in elevation in FIG. 5. The annular portion 20 is formed with integral driving means consisting of an arcuately spaced series of radially extending lugs 22. As illustrated in FIG. 5, the lugs 22 are defined as pie-shaped segments of a circle, and are symmetrically annularly spaced about the portion 20. The lugs are effectively formed in axial pairs there being one lug 22 of each pair formed on each axial side of the portion 20, as shown by the sectional view of FIG. 3. The drive lugs accordingly define flat driving faces 24 which preferably lie along radius lines in relation to the center of the hub. However, it is within the scope of the invention to provide other forms of axial protuberances or drive portions other than the arcuate segments 22 of the preferred embodiment.

Means for absorbing rotational speed variations for damping the spider 10 and the attached blades 12, includes a pair of identical molded elastomeric blocks 30, as shown in FIGS. 4 and 6. The blocks 30 are formed with a central opening 32 adapted to be received over the hub 15. The blocks are with inside surfaces formed with arcuately spaced cut-out portions 34 or recesses corresponding closely in shape to that of the lugs 22, so that when a pair of the blocks 30 are assembled on the hub in face-to-face relation, the cut-out portions 34 completely receive corresponding ones of the lugs 22.

The outside radial surfaces of the blocks 30 are identically formed with a corresponding plurality of arcuately spaced driving lugs or members 35 defining in effect arcuate recesses or cut-out sections 36 therebetween, as shown in elevation in FIG. 6. Preferably the driving portions 35 are formed axially opposite the corresponding driving recesses 24 so as to maintain a desired axial thickness of the material forming the blocks 30, and define radial walls 35' similar to the walls 24.

As illustrated in FIGS. 1 and 7, the spider 10, at the portion 14, is formed with an opening defining a series of arcuate recesses 38 adapted to receive the drive portions 35 therein. There is a corresponding intermediate series of inwardly extending lugs or fingers 39 which are received within the cut-out sections 36.

The invention further includes a cap 40 which is generally cup-shaped and which has a back 41 formed with the identical recesses 38 and lugs 39 as described in connection with the web 10. The cap is formed with radially extending lip or flange 42 which mounts against the annular surface 14 of the web and which may be connected thereto by a series of bolts 44 or rivets. The axial thickness of the cup 40 as defined by the intermediate wall 45 is such as to receive the pairs of blocks 30 on the axial opposite sides of the drive web 20, with the corresponding parts interfitted into the spider and cup cut-outs without any appreciable compression on the elastomeric members.

The cup flange 42 is formed with radially opposite projections 50 which nest in recesses or holes 52 formed in spider 10. The interfitted projections 50 and recess 52 maintain accurate alignment of these parts.

The operation of the invention is largely self-evident from the foregoing description. It will be seen that the relative positions of the cup 40 and the web 10 are reversible, as are the blocks 30, thus providing versatility in assembling the parts. Where the cup 40 is positioned on the outside surface it may be formed with a continuous back so as to exclude moisture or weather from th interior of the assembly. This is useful in outdoor vertical shaft installations. Further, the arrangement is one in which the elastomeric blocks are each independently driven by the opposite sides of the annular driving member 20. There is no transmission of torque from one block to the other and in fact these blocks are axially separated. Since the torque is applied symmetrically to the blocks, the corresponding torque is applied through rotational shear symmetrically to the spider portion 14 and to the cup 40. Although the blocks 30 are independent they act together to absorb and damp vibrations and are effective in doing this due to the absence of any appreciable axial compression or distorting forces. Accordingly, the full range of deflection of the elastomer is available for this purpose.

While the form of apparatus herein described constitutes a preferred embodiment of the invention, it is to be understood that the invention is not limited to this precise form of apparatus, and that changes may be made therein without departing from the scope of the invention.

What is claimed is:

1. A resilient drive coupling hub for mounting a propeller-type fan or the like onto the shaft of a drive motor to reduce the transmission of vibration to the propeller blades, comprising a hub body adapted to be secured to the motor shaft, said body having a drive portion defining a plurality of arcuately spaced drive segments formed on each axial side of said drive portion, a pair of apertured elastomeric blocks having axially fading recesses corresponding in shape to said segments and adapted to be received on each axial side of said segments to receive said segments therein, each of said blocks further having means defining a plurality of axially opposite arcuately spaced drive lugs formed on the opposite surface thereof, a blade supporting spider having a central opening adapted to receive the drive lugs of one of said blocks, a cup having means defining a complementary recess adapted to receive the corresponding drive lugs of the other of said blocks and formed with a radial flange, and means joining said cup flange to an adjacent radial face of said spider free of appreciable axial compression of said blocks.

2. The hub of claim 1 in which said drive segments consist of a plurality of arcuately spaced segments with radial drive surfaces.

3. The hub of claim 1 in which said blocks are reversible.

4. The hub of claim 3 in which said spider and said cup are reversible with respect to relative positions on said hub body.

5. A resilient drive coupling hub for mounting a driven member such as a spider for propeller-type fan or the like onto the shaft of a drive motor to reduce the transmission of vibrations to the driven member, comprising a hub body adapted to be secured to the motor shaft, said hub body having an annular drive portion defining a plurality of arcuately-spaced, radially-extending drive segments formed on each axial side of said drive portion, a pair of apertured elastomeric blocks having axially facing cut-out portions adapted to be received on each axial side of said segments to receive said segments therein, means on said blocks further defining a corresponding plurality of axially opposite arcuately spaced drive lugs formed on the opposite surface thereof, said driven member having a disc-like central section defining a central opening therethrough adapted to receive the drive lugs of one of said blocks therein, a cup having means defining a recess adapted to receive the corresponding drive lugs of the other of said blocks and having means extending axially and joining with said driven member, the axial extent of said cup being sufficient to encompass said hub body and said blocks free of appreciable axial compression of said blocks.

* * * * *